UNITED STATES PATENT OFFICE.

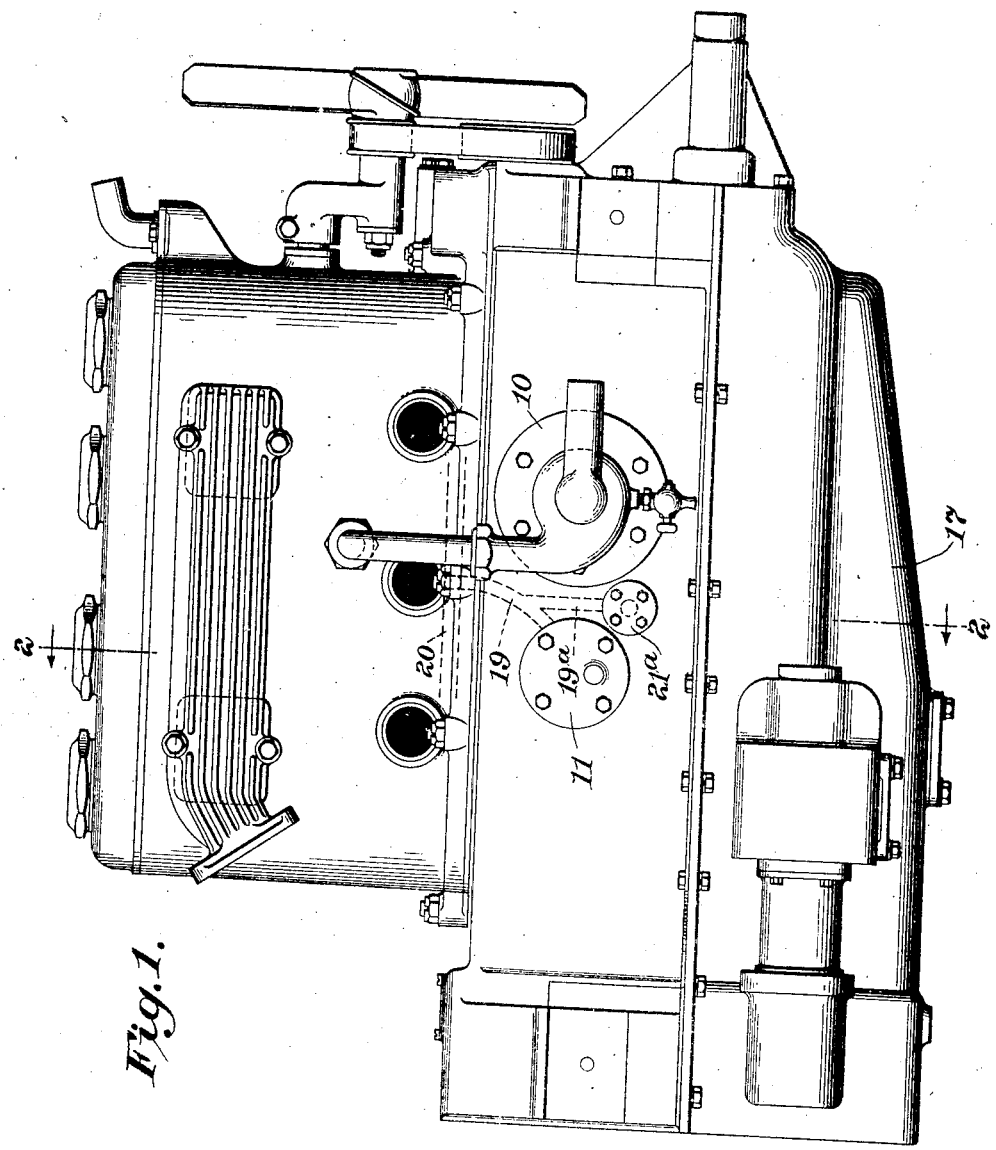

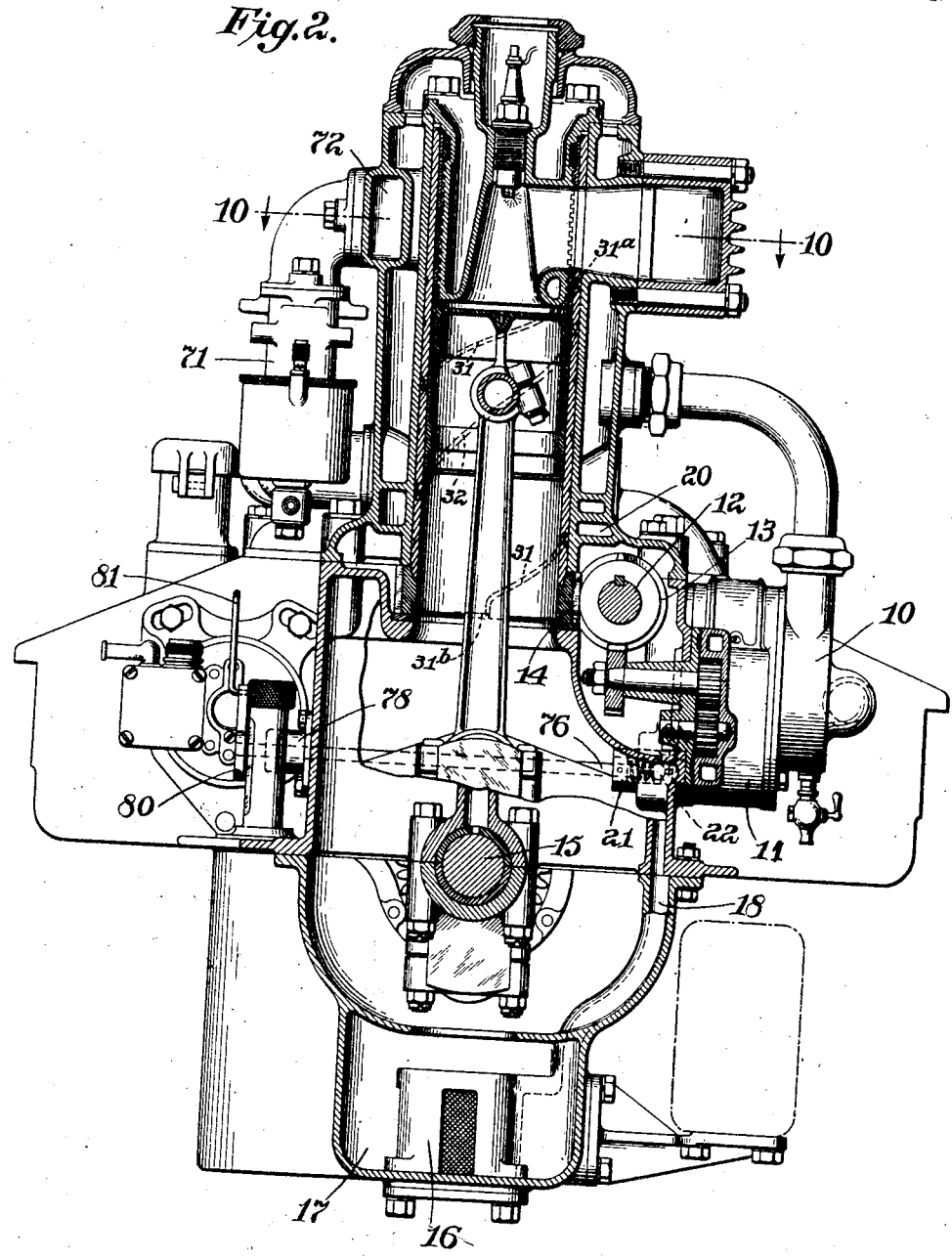

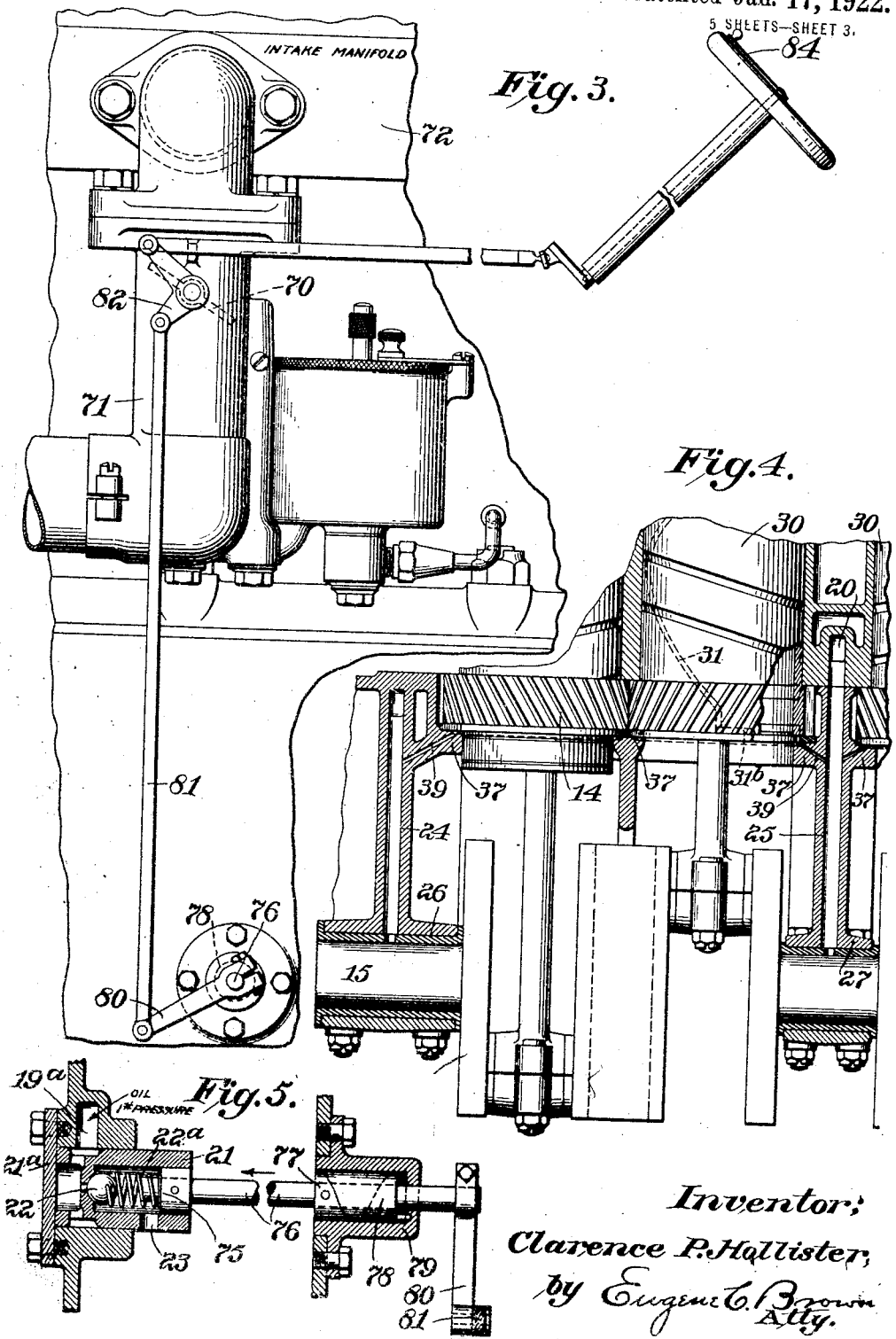

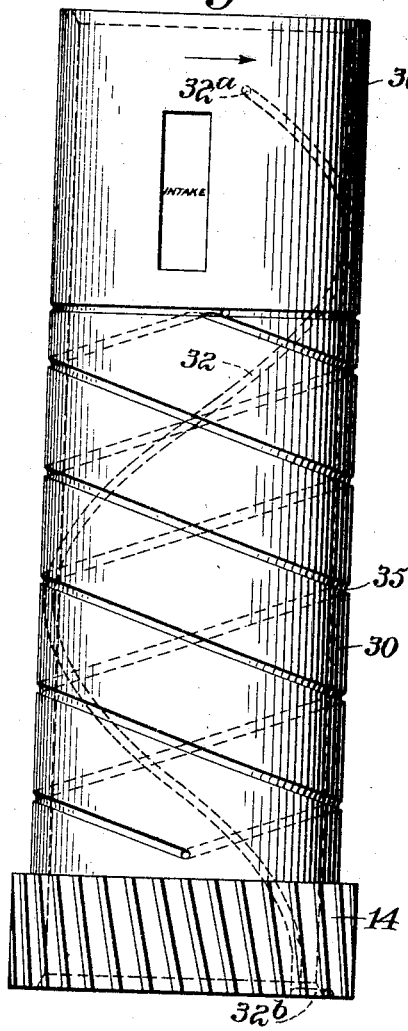
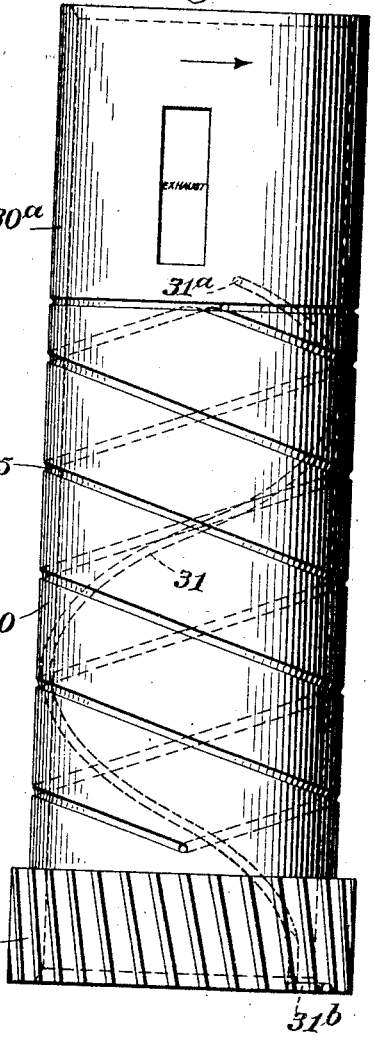
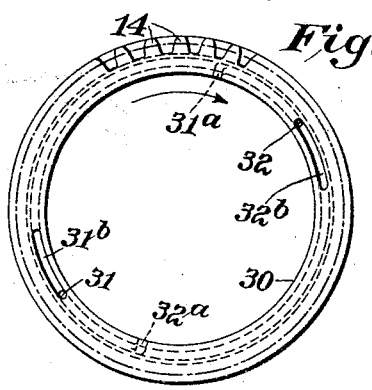
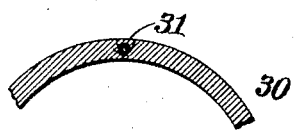

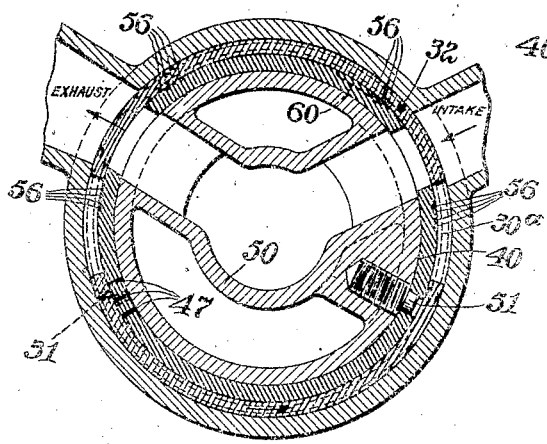
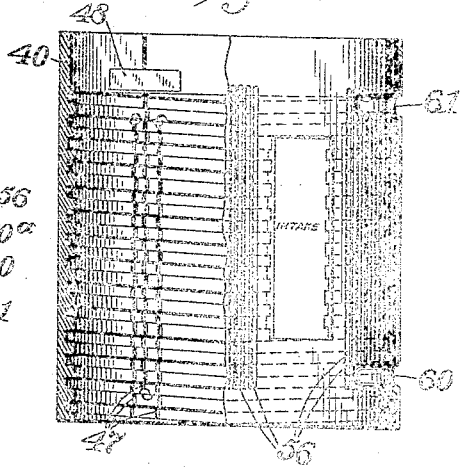
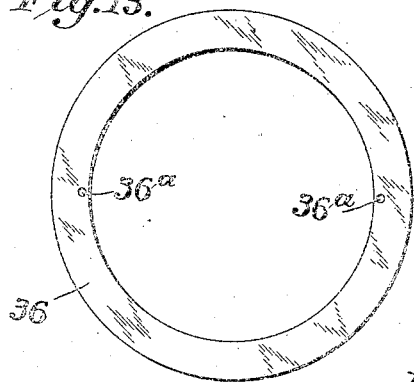
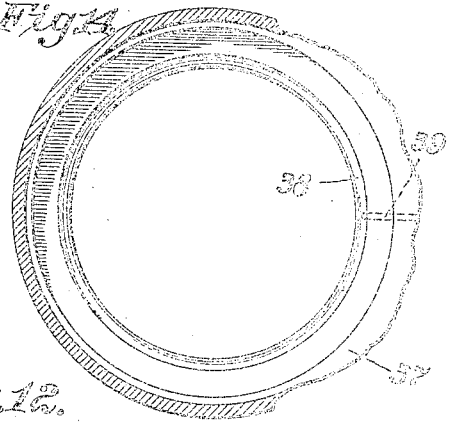
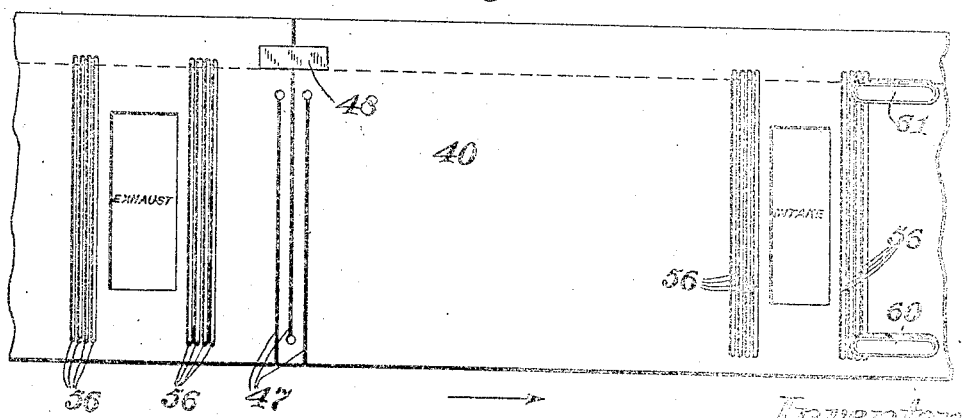

CLARENCE P. HOLLISTER, OF NEW YORK, N. Y.

LUBRICATING SYSTEM FOR INTERNAL-COMBUSTION ENGINES.

1,403,957.  Specification of Letters Patent.  Patented Jan. 17, 1922.

Application filed October 31, 1918. Serial No. 260,502.

*To all whom it may concern:*

Be it known that I, CLARENCE P. HOLLISTER, a citizen of the United States, residing at New York, in the county of New York and State of New York, have invented certain new and useful Improvements in Lubricating Systems for Internal-Combustion Engines, of which the following is a specification.

This invention relates to the lubrication of the valves of internal combustion engines of the sleeve valve type.

The object of my invention is to provide a lubricating system which will always ensure an ample supply of lubricating oil to the surfaces of the sleeve valves and in which the oil pressure in the system is automatically regulated to provide a uniform supply of oil under all conditions of load and at all speeds. The rotary sleeve-valve is recognized as being superior in many respects to the poppet valve but great difficulty has been experienced in the matter of proper lubrication. When provision was made for an adequate supply during high speed and normal or heavy duty upon the engine, the supply of oil was too great when the engine was throttled or when operating under light load, as when running down grade, which resulted in a flooding of oil which caused dense clouds of smoke to be discharged from the exhaust when the throttle was afterward opened to increase the speed or load of the motor.

The manner in which I have overcome these prior difficulties, and have produced a uniform feed of lubrication oil to the rubbing surfaces of the sleeve-valve will be understood from the following description in connection with the accompanying drawings in which—Figure 1 is a side elevation of an engine embodying my invention; Fig. 2 is a vertical transverse sectional view on the line 2—2 of Fig. 1; Fig. 3 is a fragmentary side elevation taken from the side opposite Fig. 1; Fig. 4 is an enlarged detail sectional view showing the oil supply to the sleeve valves and to the engine crank shaft; Fig. 5 is an enlarged detail sectional view, partly broken away, of the oil pressure regulator; Figs. 6 and 7 are side elevations of one of the sleeve valves, Fig. 8, is a bottom plan view of one of the sleeve valves; Fig. 9 is a fragmentary sectional view of the valve wall or casing; Fig. 10 is a cross sectional view on the line 10—10 of Fig. 2; Fig. 11 is a side elevation, partly in section of one of the compression shells; Fig. 12 is a developed diagram of the same; Fig. 13, is a plan view of one of the bearing or thrust rings for the sleeve valves; and Fig. 14 is a top plan view of one of the annular supporting flanges constituting thrust seats for the bearing rings.

The main features of the engine illustrated in the drawings are the same as described in my application, Serial No. 219,623 filed Feb. 28, 1918. The water circulating pump 10 and oil pump 11, are connected by suitable gearing with the timing shaft 12 which is driven from the engine crank shaft 15 and connected by worm-gears 13 with the gears 14 of the sleeve valves. The oil is lifted by the pump from the oil well 16 in the pan or sump 17 through the channel 18 and forced into the main distributing oil passage 20, extending longitudinally of the engine, in the manner set forth in my application filed January 7, 1919, Serial No. 270,005. The oil passes from the main passage 20 through the hollow standards, 24, 25 to the crank-shaft bearings 26, 27.

In my application Serial No. 219623, I have disclosed a method of lubricating the outer peripheral surfaces of the valves. In order to constantly lubricate the inner faces or surfaces of the upper port sections 30$^a$ of the sleeve valves 30 which engage the outer peripheral surfaces of the compression sleeves, I provide ducts within the walls of the valves for conveying oil under pressure to these surfaces. These ducts may consist of small tubes 31, 32 embedded within the walls when the valves are cast or embedded in grooves which may be filled with metal flush with the surface as illustrated in Fig. 9. They do not interfere with the external oil grooves 35 which extend thereover. The upper ends of these tubes terminate in openings 31$^a$, 32$^a$ upon the inner periphery of the valves, while the lower ends terminate in slots 31$^b$, 32$^b$ in the bottom of the valve walls. The bearing rings 36 upon which the sleeve valves rest, are provided with apertures 36$^a$ for the passage of oil, and which align with the slots 31$^b$, 32$^b$ during each revolution of the valves. The annular supporting flanges 37, constituting the thrust seats for the bearing rings are provided with annular grooves 38, which are in alignment with the oil passages 36ª in the bearing rings, these grooves being constantly supplied with oil through the ducts 39, which intercept the oil channels in the crank shaft bearing standards 24, 25, in which the oil is maintained under pressure from the main oil channel 20.

The compression cylinders or sleeves 40, are constructed substantially in the manner described in my Patent No. 1,362,312, Dec. 14, 1920. These compression sleeves are made of integral rings or cylinders and are made compressible by a series of slots 47, extending alternately from opposite edges partially across the ring; the slot or slots extending from the upper edge being shut off or closed by means of a closure plate 48 fitted into a transverse slot in the ring. The inner surface of the sleeve may be provided with threads, preferably of squared section, to engage corresponding threads upon the exterior wall of the depending cylinder head 50. The compression ring may be held stationary by means of a pin 51 secured in the head and having a projecting end entering an aperture in the ring. When the cylinder head with the surrounding compression ring 40 is inserted within the sleeve valve, it is necessary to slightly compress the ring and it then springs outwardly into close contact with the inner walls of the valve.

It will be appreciated by engineers that it is quite important to keep the engaging surfaces of the compression ring and sleeve valve well lubricated upon either side of the intake and exhaust ports. I provide the compression rings with a series of closely adjacent vertical grooves 56, which form little receptacles for oil and also for any particles of carbon that may be deposited. The oil is taken up by the inner surface of the sleeve valve which revolves in the direction of the arrow in Fig. 12, so that the oil becomes distributed over the entire contacting surfaces of the valve and the ring. The oil also serves to prevent the carbon particles which collect in the grooves from becoming hard.

In my prior application, Serial No. 270,005, I have described one method of supplying oil to the grooves 56 and in the present case I employ another method which may be used either alone or in conjunction with said previously disclosed method. I provide short transversely arranged grooves 60, 61 in the compression rings which may extend into the vertical series of grooves 56 upon the right or leading side of the intake port. These short grooves 60, 61 are in the path of travel of the oil duct openings 31ª, 32ª respectively, and constitute oil supply-pockets, the function of which will now be apparent.

Oil is maintained under pressure by the oil pump in the main oil channel 20 and in the branch oil passages in the crank bearing standards 24, 25, and from these through the ducts 39, so that the oil in the annular channels 38, in the sleeve-valve thrust seats is constantly maintained under pressure. Accordingly whenever the oil collecting grooves 31ᵇ, 32ᵇ in the bottom rim or base of the valves, pass over the holes or passages 36ª in the bearing rings, oil is forced into the oil tubes or ducts 31, 32 in the valve walls. The oil passages 36ª are so placed that the oil collecting grooves 31ᵇ and 32ᵇ will pass thereover, and the outlets 31ª and 32ª will alternately register with the oil pockets 60 and 61, during the exhaust periods. The oil pressure is sufficient to force oil into the pockets and along the connecting grooves 56, overcoming the outward pressure of the exhaust gases. During the intake periods, the suction of the intake draws the oil inwardly from the pockets 60, 61, which were filled as the outlets 31,ª 32ª passed over them, and is spread along the grooves 56, from which it is distributed over the walls of the revolving valve.

I have found that the method above described furnishes an adequate supply of oil to form a film of oil over the contacting surfaces of the compression ring and sleeve valve, but the supply is liable to be too great under light loads with the throttle partly closed, as when the machine is running upon a down grade, or when running slowly, because the increased vacuum caused thereby produces an increased suction which draws too much oil through the oil ducts. As is well known, too much oil supplied to the valve surfaces causes the engine to emit dense smoke from the exhaust as soon as the throttle is again opened to speed up the engine.

For this purpose I control the pressure maintained by the oil pump 12 by connecting the main oil passage 19 leading from the oil pump 11, with a by-pass or branch 19ª, leading to a valve casing 21, having a passage controlled by a spring-pressed check valve 22, and an outlet 23, opening into the oil pan. Access to the valve casing may be had by removing the plate 21ª. When the throttle 70, controlling the passage from the carbureter 71 to the intake manifold 72, is in open position, the spring 22ª holds the valve 22 against its seat with just sufficient pressure to resist the normal oil pressure and opens to relieve the pressure upon any increase by permitting oil to flow through the relief outlet 23. As the throttle is moved toward the closed position, the vacuum in the intake is increased thus creating an increased suction which tends to draw more oil through the ducts 31, 32. I, therefore, reduce the pressure maintained in the oil passages by decreasing the pressure exerted by the spring 22ª upon the valve 22, in proportion to the increase in the vacuum or suction in the intake caused by the closing movement of the throttle 70. For this purpose I adjust the plate or ring 75 toward or from the valve 22, by securing it to a rod 76, carrying the cam member 77, which cooperates with the cam member 78, fixed to the bearing sleeve 79, to advance or retract the rod as it is rotated. By connecting the rod through the arm 80 and link 81, with the bell-crank 82, on the shaft of the throttle, the pressure of the spring 22ª on the relief valve 22, is automatically varied in accordance with the position of the throttle, the latter being controlled in the usual manner by the throttle lever 84 on the steering wheel of the vehicle. The parts are shown in Fig. 5 in the retracted position corresponding with a closed throttle, so that the minimum pressure is exerted by the spring upon the relief valve 22 and consequently the minimum pressure is maintained in the oiling system.

The operation of my lubricating system will be understood from the foregoing detailed description of parts and its advantages will be appreciated especially by engineers familiar with the construction and operation of internal combustion engines of the sleeve valve type. It will be understood that various changes and modifications of the construction may be made within the scope of my claims and for the purpose of carrying out my invention.

I claim:—

1. A lubricating system for the sleeve valves of internal combustion engines, comprising a tubular oil duct extending from the base of the sleeve valve to a point in the upper peripheral surface thereof and means for supplying oil under pressure to the lower end of said duct.

2. A lubricating system for the sleeve valves of internal combustion engines, comprising a tubular oil duct extending from the base of the sleeve valve to a point in the upper peripheral surface thereof, means for supplying the lower end of said duct with oil under pressure, and means for varying the oil pressure in accordance with changes in the position of the engine throttle, said means being provided with an automatic relief valve operating upon an excess pressure.

3. A lubricating system for supplying oil to the contacting surfaces between sleeve valves and compression rings of internal combustion engines, comprising an oil duct extending through the wall of the sleeve valve from an aperture in the base to an opening in the peripheral surface thereof, a groove or oil pocket in the periphery of the compression ring in the path of said opening during the rotation of the valve, and means for supplying oil under pressure to said aperture.

4. A lubricating system for supplying oil to the contacting surfaces between sleeve valves and compression rings of internal combustion engines, comprising an oil duct extending through the wall of the sleeve valve from an aperture in the base to an opening in the peripheral surface thereof, a groove or oil pocket in the periphery of the compression ring in the path of said opening during the rotation of the valve, a thrust seat for said valve having an oil groove adapted to communicate with the apertures in the base of the valve, an oil passage or channel having communication with said oil groove and means for supplying said oil passage with oil under pressure.

5. A lubricating system as defined in claim 4, in which a bearing ring is interposed between the base of the valve and the thrust seat and is provided with passages forming a communication between the oil groove and the aperture in the valve base.

6. A lubricating system as defined in claim 4, in which means is provided for varying the oil pressure in accordance with the changes in the position of the engine throttle, said means being provided with an automatic relief valve operating upon an excess pressure.

7. A lubricating system for supplying oil to the engaging surfaces between the rotary sleeve valves and the stationary compression rings of internal combustion engines, comprising oil ducts extending through the walls of the sleeve valve from apertures in the base to openings at points above and below the ports in the periphery of the valve, grooves forming oil pockets in the periphery of the compression ring in the path of travel of said openings, a thrust seat provided with oil grooves, bearing rings interposed between said seat and the base of the sleeve valve and having passages forming communications between said oil groove and said apertures, an oil channel having a duct connecting with said oil groove, an oil pump supplying oil under pressure to said channel, a relief valve communicating with said oil channel, and means controlled by the position of the engine throttle for varying the pressure at which said relief valve opens to relieve the pressure in said oil channel.

In testimony whereof I affix my signature.

CLARENCE P. HOLLISTER.